US011645297B2

(12) United States Patent
Rao Krishnagi et al.

(10) Patent No.: US 11,645,297 B2
(45) Date of Patent: May 9, 2023

(54) SYSTEM AND METHOD FOR SMART DATABASE DRIVER

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Nalini S Boda, Lewis Center, OH (US); Vijay Kumar Perla, Westerville, OH (US); Laxman Dongisharapu, Hyderabad (IN); Srikanth Malireddy, Gudiwada (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 252 days.

(21) Appl. No.: 17/190,744

(22) Filed: Mar. 3, 2021

(65) Prior Publication Data

US 2022/0284032 A1    Sep. 8, 2022

(51) Int. Cl.
*G06F 16/00*     (2019.01)
*G06F 16/25*     (2019.01)
*G06F 16/955*    (2019.01)
*H04L 9/08*      (2006.01)
*H04L 9/32*      (2006.01)
*G06F 9/445*     (2018.01)

(52) U.S. Cl.
CPC ........ *G06F 16/252* (2019.01); *G06F 9/44505* (2013.01); *G06F 16/9566* (2019.01); *H04L 9/085* (2013.01); *H04L 9/3213* (2013.01)

(58) Field of Classification Search
CPC .............. G06F 16/252; G06F 16/9566; G06F 9/44505; H04L 9/3213; H04L 9/085
See application file for complete search history.

(56) References Cited

U.S. PATENT DOCUMENTS

| 2013/0333002 A1* | 12/2013 | Belton .................. H04L 63/10 726/5 |
| 2017/0026362 A1* | 1/2017 | O'Donnell .......... H04L 63/0807 |
| 2018/0212956 A1* | 7/2018 | Sanganabhatla .... H04L 63/0838 |

OTHER PUBLICATIONS

Kohl et al., "The Evolution of the Kerberos Authentication Service," IEEE Computer Society Press, pp. 1-15, 2009. (Year: 2009).*

* cited by examiner

*Primary Examiner* — Cheryl Lewis
(74) *Attorney, Agent, or Firm* — Greenblum & Bernstein, P.L.C.

(57) ABSTRACT

Various methods, apparatuses/systems, and media for implementing a smart database driver are disclosed. A receiver receives a request for establishing a connection between an application and a target database. A processor, operatively coupled to the receiver via a communication network, authenticates the application by implementing a java authentication authorization service (jaas). Authentication of the application is performed at runtime with connection properties and configuration details provided via system properties or environment variables. The processor also generates a database connection uniform resource locator (URL), validates the URL; and establishes a connection between the application and the target database based on the validation of the URL and successful authentication of the application.

20 Claims, 7 Drawing Sheets

SYSTEM AND METHOD FOR SMART DATABASE DRIVER

TECHNICAL FIELD

This disclosure generally relates to data processing, and, more particularly, to methods and apparatuses for implementing a smart database driver that provides a suite of JDBC (Java database connectivity) drivers for integrating with databases to be utilized by Java applications.

BACKGROUND

Kerberos is a secure authentication mechanism that does not require sending passwords over the network. Implementing Kerberos may require code changes for existing applications. For example, a company's application modernization rule may require every application to utilize Kerberos authentication to connect to a target database. In order to meet this rule, every application may need to make code changes which may prove to be particularly difficult for applications where high level of effort or significant learning may be required by teams. Many third-party applications or third-party products may not support Kerberos.

SUMMARY

The present disclosure, through one or more of its various aspects, embodiments, and/or specific features or sub-components, provides, among other features, various systems, servers, devices, methods, media, programs, and platforms for implementing a smart database driver that provides a suite of JDBC drivers for seamless integration with Java applications that run in containers or third-party products/applications to connect to databases that may not support Kerberos authentication out of the box, but the disclosure is not limited thereto. For example, the present disclosure, through one or more of its various aspects, embodiments, and/or specific features or sub-components, also provides, among other features, various systems, servers, devices, methods, media, programs, and platforms for implementing a smart database driver that provides a reusable plug and play solution to accelerate Kerberos authentication for a database (e.g., Oracle and DB2 database, etc., but the disclosure is not limited thereto), speeding up application modernization, saving developing hours for each application, authenticating an application with minimal configurations—not requiring any application level code changes, etc., but the disclosure is not limited thereto.

According to an aspect of the present disclosure, a method for implementing a smart database driver by utilizing one or more processors and one or more memories is disclosed. The method may include: receiving a request for establishing a connection between an application and a target database; authenticating the application by implementing a java authentication authorization service (jaas), wherein authentication of the application is performed at runtime with connection properties and configuration details provided via system properties or environment variables; generating a database connection uniform resource locator (URL); validating the URL; and establishing a connection between the application and the target database based on the validation of the URL and successful authentication of the application.

According to another aspect of the present disclosure, wherein the application may be independent of underlying authentication mechanism.

According to yet another aspect of the present disclosure, the method may further include: creating a jaas configuration file that contains Kerberos login module to connect to the target database; and implementing a credential cache from the Kerberos login module configuration to acquire a ticket granting ticket (TGT) to authenticate the application.

According to a further aspect of the present disclosure, the method may further include: implementing a keytab file that contains a secret key; and implementing the secret key to authenticate the application.

According to an additional aspect of the present disclosure, the method may further include: removing username and password based authentication; and implementing Kerberos authentication.

According to yet another aspect of the present disclosure, the method may further include: creating an abstract Kerberos driver class that implements a java.sql.driver interface and implementing a connect method included in the java.sql.driver interface to authenticate the application and establish the connection between the application and the target database.

According to a further aspect of the present disclosure, the method may further include: creating a Kerberos Oracle driver class that extends the abstract Kerberos driver class and overrides the connect method for enforcing Kerberos connectivity for Oracle database connections.

According to an additional aspect of the present disclosure, the method may further include: creating a Kerberos DB2 driver class that extends the abstract Kerberos driver class and overrides the connect method for enforcing Kerberos connectivity for DB2 database connections.

According to an aspect of the present disclosure, a system for implementing a smart database driver is disclosed. The system may include a receiver for receiving a request for establishing a connection between an application and a target database and a processor operatively coupled to the receiver via a communication network. The processor may be configured to: authenticate the application by implementing a java authentication authorization service (jaas), wherein authentication of the application is performed at runtime with connection properties and configuration details provided via system properties or environment variables; generate a database connection uniform resource locator (URL); validate the URL; and establish a connection between the application and the target database based on the validation of the URL and successful authentication of the application.

According to another aspect of the present disclosure, the processor may be further configured to: create a jaas configuration file that contains Kerberos login module to connect to the target database; and implement a credential cache from the Kerberos login module configuration to acquire a ticket granting ticket (TGT) to authenticate the application.

According to a further aspect of the present disclosure, the processor may be further configured to: implement a keytab file that contains a secret key; and implementing the secret key to authenticate the application.

According to an additional aspect of the present disclosure, the processor may be further configured to: remove username and password based authentication; and implement Kerberos authentication.

According to yet another aspect of the present disclosure, t the processor may be further configured to: create an abstract Kerberos driver class that implements a java.sql.driver interface and implement a connect method included in the java.sql.driver interface to authenticate the application and establish the connection between the application and the target database.

According to a further aspect of the present disclosure, the processor may be further configured to: create a Kerberos Oracle driver class that extends the abstract Kerberos driver class and overrides the connect method for enforcing Kerberos connectivity for Oracle database connections.

According to an additional aspect of the present disclosure, the processor may be further configured to: create a Kerberos DB2 driver class that extends the abstract Kerberos driver class and overrides the connect method for enforcing Kerberos connectivity for DB2 database connections.

According to an aspect of the present disclosure, a non-transitory computer readable medium configured to store instructions for implementing a smart database driver is disclosed. The instructions, when executed, may cause a processor to perform the following: causing a receiver to receive a request for establishing a connection between an application and a target database; authenticating the application by implementing a java authentication authorization service (jaas), wherein authentication of the application is performed at runtime with connection properties and configuration details provided via system properties or environment variables; generating a database connection uniform resource locator (URL); validating the URL; and establishing a connection between the application and the target database based on the validation of the URL and successful authentication of the application.

According to another aspect of the present disclosure, when executed, the instructions may further cause the processor to perform the following: creating a jaas configuration file that contains Kerberos login module to connect to the target database; and implementing a credential cache from the Kerberos login module configuration to acquire a ticket granting ticket (TGT) to authenticate the application.

According to a further aspect of the present disclosure, when executed, the instructions may further cause the processor to perform the following: implementing a keytab file that contains a secret key; and implementing the secret key to authenticate the application.

According to an additional aspect of the present disclosure, when executed, the instructions may further cause the processor to perform the following: removing username and password based authentication; and implementing Kerberos authentication.

According to yet another aspect of the present disclosure, when executed, the instructions may further cause the processor to perform the following: creating an abstract Kerberos driver class that implements a java.sql.driver interface and implementing a connect method included in the java.sql.driver interface to authenticate the application and establish the connection between the application and the target database.

According to a further aspect of the present disclosure, when executed, the instructions may further cause the processor to perform the following: creating a Kerberos Oracle driver class that extends the abstract Kerberos driver class and overrides the connect method for enforcing Kerberos connectivity for Oracle database connections.

According to an additional aspect of the present disclosure, when executed, the instructions may further cause the processor to perform the following: creating a Kerberos DB2 driver class that extends the abstract Kerberos driver class and overrides the connect method for enforcing Kerberos connectivity for DB2 database connections.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
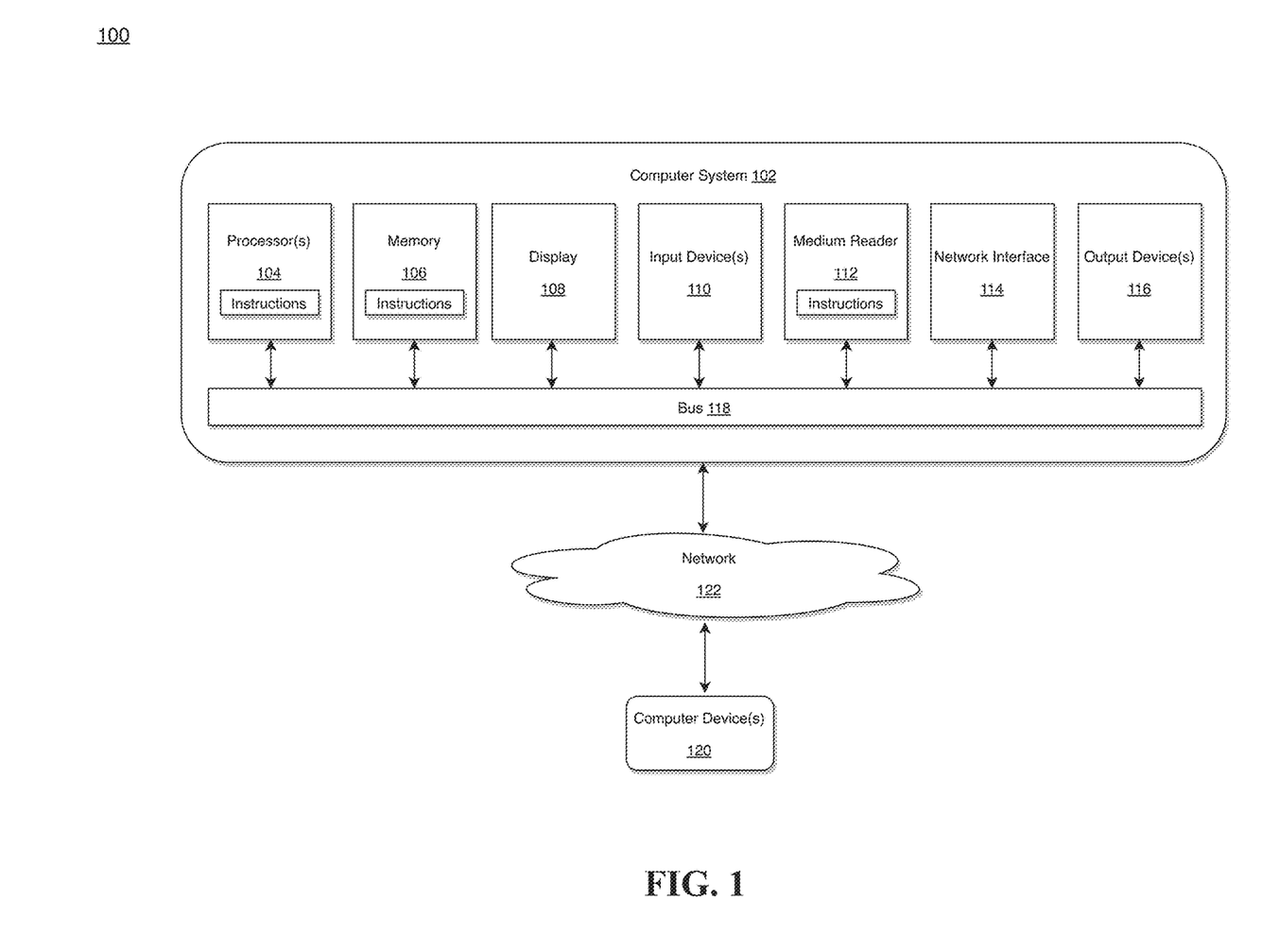
FIG. 1 illustrates a computer system for implementing a smart database driver in accordance with an exemplary embodiment.

FIG. 1 is an exemplary system for use in implementing a smart database driver in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a smart database driver that provides a suite of JDBC (Java database connectivity) drivers for integrating with Java applications that run in containers or third-party products/applications to connect to databases that may not support Kerberos authentication, but the disclosure is not limited thereto.

Figure 2:
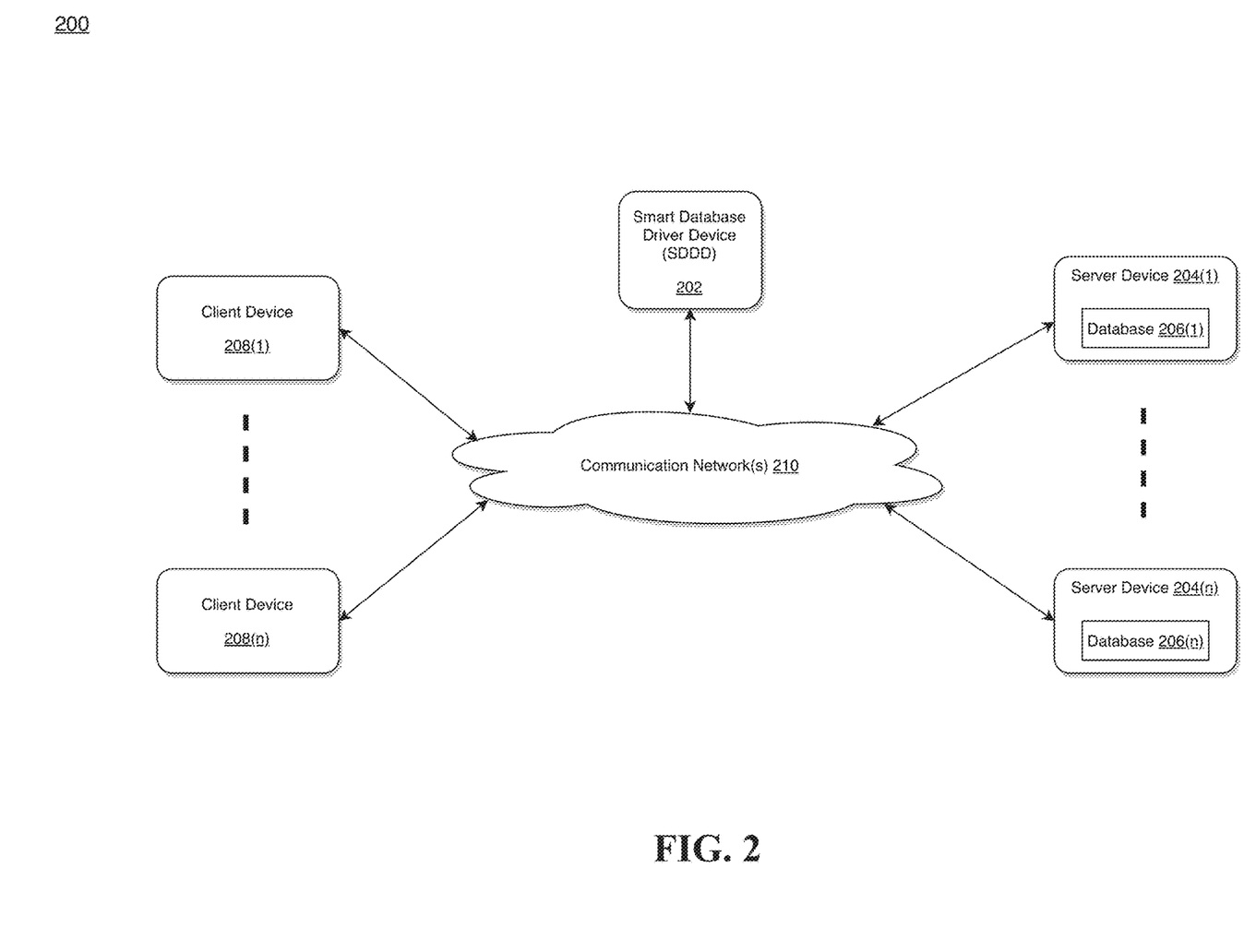
FIG. 2 illustrates an exemplary diagram of a network environment with a smart database driver device in accordance with an exemplary embodiment.

Referring to FIG. 2, a schematic of an exemplary network environment 200 for implementing a smart database driver device (SDDD) of the instant disclosure is illustrated.

According to exemplary embodiments, the above-described problems associated with conventional method and systems may be overcome by implementing an SDDD 202 as illustrated in FIG. 2 by implementing a smart database driver that provides a suite of JDBC (Java database connectivity) drivers for integrating with Java applications that run in containers or third-party products/applications to connect to databases that may not support Kerberos authentication, but the disclosure is not limited thereto.

The SDDD 202 may be the same or similar to the computer system 102 as described with respect to FIG. 1.

The SDDD 202 may store one or more applications that can include executable instructions that, when executed by the SDDD 202, cause the SDDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDDD 202 itself, may be located in virtual server(s) running in a cloud-based computing environment rather than being tied to one or more specific physical network computing devices. Also, the application(s) may be running in one or more virtual machines (VMs) executing on the SDDD 202. Additionally, in one or more embodiments of this technology, virtual machine(s) running on the SDDD 202 may be managed or supervised by a hypervisor.

In the network environment 200 of FIG. 2, the SDDD 202 is coupled to a plurality of server devices 204(1)-204(n) that hosts a plurality of databases 206(1)-206(n), and also to a plurality of client devices 208(1)-208(n) via communication network(s) 210. A communication interface of the SDDD 202, such as the network interface 114 of the computer system 102 of FIG. 1, operatively couples and communicates between the SDDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDDD 202, the server devices 204(1)-204

(*n*), and/or the client devices **208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IPover Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like). Public Switched Telephone Network (PSTNs). Ethernet-based Packet Data Networks (PDNs), combinations thereof, and the like.

The SDDD 202 may be a standalone device or integrated with one or more other devices or apparatuses, such as one or more of the server devices **204(1)-204(*n*), for example. In one particular example, the SDDD 202 may be hosted by one of the server devices 204(1)-204(*n*), and other arrangements are also possible. Moreover, one or more of the devices of the SDDD 202** may be in a same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the SDDD 202 via the communication network(s) 210** according to the HTTP-based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store metadata sets, data quality rules, and newly generated data.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*)**.

According to exemplary embodiments, the client devices **208(1)-208(*n*) in this example may include any type of computing device that can facilitate the implementation of the SDDD 202** that may be configured for implementing a smart database driver that provides a suite of JDBC (Java database connectivity) drivers for integrating with Java applications that run in containers or third-party products/applications to connect to databases that may not support Kedberos authentication, but the disclosure is not limited thereto.

Accordingly, the client devices **208(1)-208(*n*)** may be mobile computing devices, desktop computing devices, laptop computing devices, tablet computing devices, virtual machines (including cloud-based computers), or the like, that host chat, e-mail, or voice-to-text applications, of other document collaborative software for example.

The client devices **208(1)-208(*n*) may run interface applications, such as standard web browsers or standalone client applications, which may provide an interface to communicate with the SDDD 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the SDDD 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDDD 202, the server devices **204(1)-204(*n*), or the client devices 208(1)-208(*n*), for example, may be configured to operate as virtual instances on the same physical machine. For example, one or more of the SDDD 202, the server devices 204(1)-204(*n*), or the client devices 208(1)-208(*n*) may operate on the same physical device rather than as separate devices communicating through communication network(s) 210. Additionally, there may be more or fewer SDDDs 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
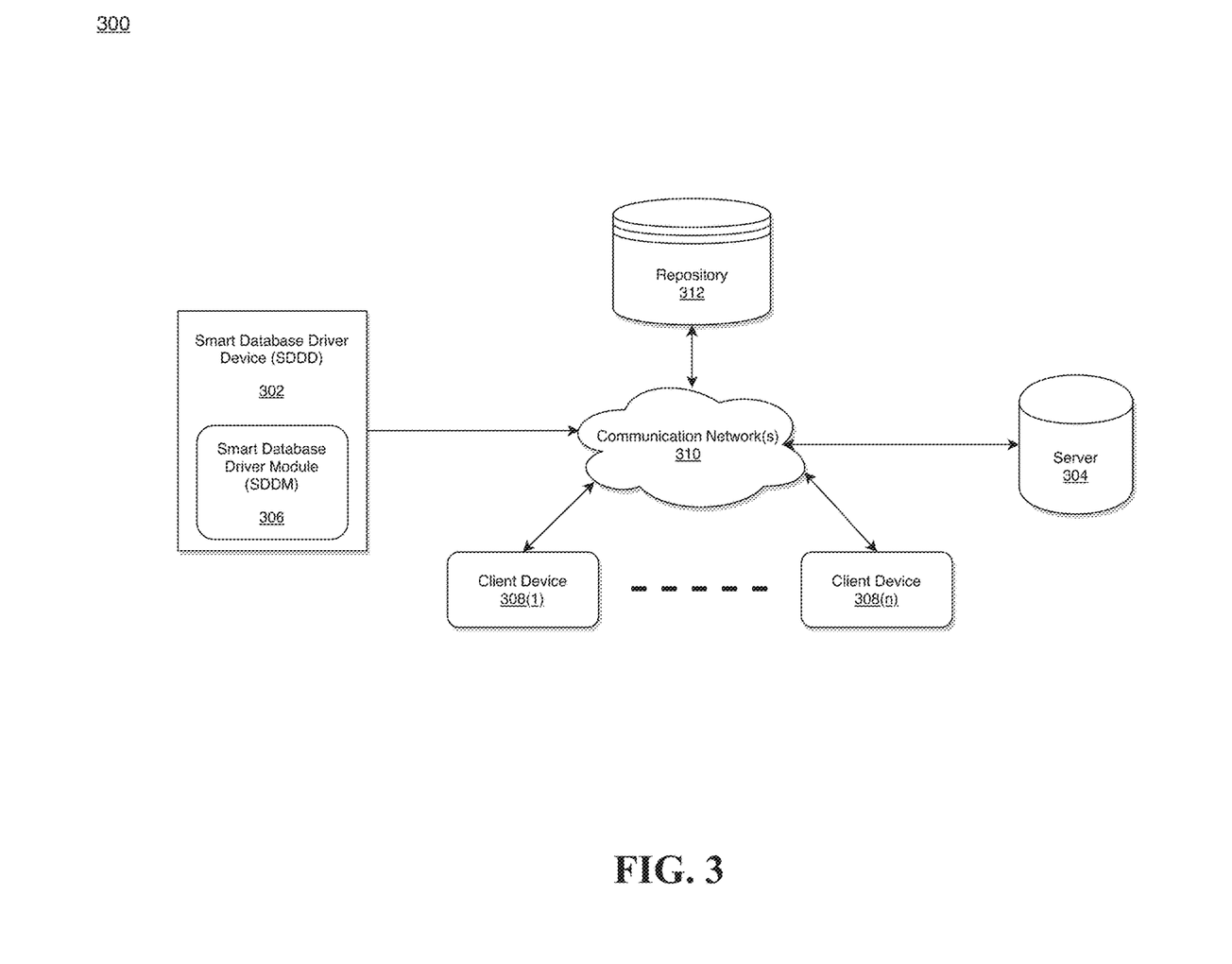
FIG. 3 illustrates a system diagram for implementing a smart database driver device with a smart database driver module in accordance with an exemplary embodiment.

FIG. 3 illustrates a system diagram 300 for implementing an SDDD with an SDDM in accordance with an exemplary embodiment.

As illustrated in FIG. 3, the SDDD 302 including the SDDM 306 may be connected to a server 304, and a repository 312 via a communication network 310. The SDDD 302 may also be connected to a plurality of client devices 308(1)-308(n) via the communication network 310, but the disclosure is not limited thereto. According to exemplary embodiments, the SDDM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the SDDD 302 is described and shown in FIG. 3 as including the SDDM 306, although it may include other rules, policies, modules, databases, or applications, for example. According to exemplary embodiments, the repository 312 may be embedded within the SDDD 302. Although only one repository 312 is illustrated in FIG. 3, according to exemplary embodiments, a plurality of repositories 312 may be provided. The repository 312 may include one or more memories configured to store login information, data files, data content, API specification definition file (e.g., in JASON format) etc., but the disclosure is not limited thereto. For example, the repository 312 may include one or more memories configured to store information including: applications (i.e., Java applications) rules, programs, production requirements, configurable threshold values defined by a product team to validate against service level objective (SLO), machine learning models, log data, hash values, etc., but the disclosure is not limited thereto. According to exemplary embodiments, the SDDM 306 may be configured to be storage platform agnostic—configured to be deployed across multiple storage layers.

According to exemplary embodiments, the SDDM 306 may be configured to receive continuous feed of data from the repository 312 and the server 304 via the communication network 310.

As will be described below, the SDDM 306 may be configured to cause a receiver to receive a request for establishing a connection between an application and a target database; authenticate the application by implementing a java authentication authorization service (jaas), wherein authentication of the application is performed at runtime with connection properties and configuration details provided via system properties or environment variables; generate a database connection uniform resource locator (URL); validate the URL; and establish a connection between the application and the target database based on the validation of the URL and successful authentication of the application, but the disclosure is not limited thereto.

The plurality of client devices 308(1)-308(n) are illustrated as being in communication with the SDDD 302. In this regard, the plurality of client devices 308(1)-308(n) may be "clients" of the SDDD 302 and are described herein as such. Nevertheless, it is to be known and understood that the plurality of client devices 308(1)-308(n) need not necessarily be "clients" of the SDDD 302, or any entity described in association therewith herein. Any additional or alternative relationship may exist between either or more of the plurality of client devices 308(1)-308(n) and the SDDD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SDDD 302 via broadband or cellular communication. Of course, these embodiments are merely exemplary and are not limiting or exhaustive.

Figure 4:
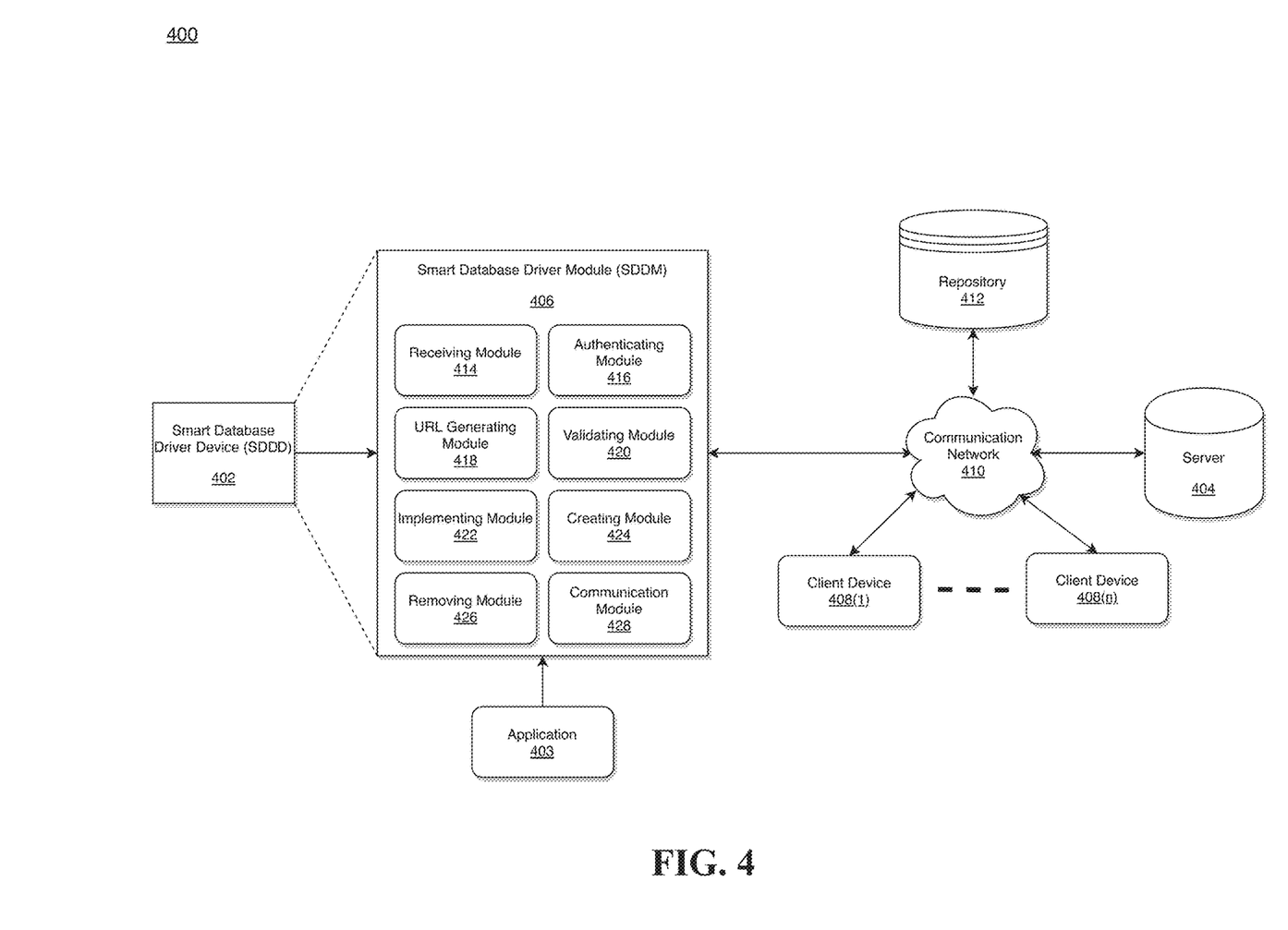
FIG. 4 illustrates a system diagram for implementing a smart database driver module of FIG. 3 in accordance with an exemplary embodiment.

FIG. 4 illustrates a system diagram for implementing an SDDM of FIG. 3 in accordance with an exemplary embodiment. As illustrated in FIG. 4, the system 400 may include an SDDD 402 within which an SDDM 406 may be embedded, a repository 412, a server 404, client devices 408(1)-408(n), and a communication network 410. According to exemplary embodiments, the SDDD 402, SDDM 406, repository 412, the server 404, the client devices 408(1)-408(n), and the communication network 410 as illustrated in FIG. 4 may be the same or similar to the SDDD 302, the SDDM 306, the repository 312, the server 304, the client devices 308(1)-308(n), and the communication network 310, respectively, as illustrated in FIG. 3.

As illustrated in FIG. 4, the SDDM 406 may include a receiving module 414, an authenticating module 416, a URL generating module 418, a validating module 420, an implementing module 422, a creating module 424, a removing module 426, and a communication module 428. According to exemplary embodiments, the repository 412 may be external to the SDDD 402 may include various systems that are managed and operated by an organization. Alternatively, according to exemplary embodiments, the repository 412 may be embedded within the SDDD 402 and/or the SDDM 406.

According to exemplary embodiments, the SDDM 406 may be implemented via user interfaces, e.g., web user interface, a build automation tool used primarily for Java projects, private Jenkins, etc., but the disclosure is not limited thereto, and may be integrated with a private cloud platform via the SDDM 406 and an authentication service, but the disclosure is not limited thereto. The user interface may be operatively connected to a system of record in one end and an open source platform for analytics and dashboard in another end.

The process may be executed via the communication module 428 and the communication network 410, which may comprise plural networks as described above. For example, in an exemplary embodiment, the various components of the SDDM 406 may communicate with the server 404, and the repository 412 via the communication module and the communication network 410. Of course, these embodiments are merely exemplary and are not limiting or exhaustive.

According to exemplary embodiments, the communication network 410 and the communication module 428 may be configured to establish a link between the repository 412, the client devices 408(1)-408(n) and the SDDM 406.

According to exemplary embodiments, each of the receiving module 414, authenticating module 416, URL generating module 418, validating module 420, implementing module 422, creating module 424, removing module 426, and the communication module 428 may be implemented by microprocessors or similar, they may be programmed using software (e.g., microcode) to perform various functions discussed herein and may optionally be driven by firmware and/or software. Alternatively, each of the receiving module 414, authenticating module 416, URL generating module 418, validating module 420, implementing module 422, creating module 424, removing module 426, and the communication module 428 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, authenticating module 416, URL generating module 418, validating module 420, implementing module 422, creating module 424, removing module 426, and the communication module 428 may be physically separated into two or more interacting and discrete blocks, units, devices, and/or modules without departing from the scope of the inventive concepts.

According to exemplary embodiments, each of the receiving module 414, authenticating module 416, URL generating module 418, validating module 420, implementing module 422, creating module 424, removing module 426, and the communication module 428 of the SDDM 406 may be called by corresponding API, but the disclosure is not limited thereto.

According to exemplary embodiments, the receiving module 414 may be configured to receive a request for establishing a connection between an application 403 (i.e., a Java application) and a target database, i.e., database 412. According to exemplary embodiments, the database 412 may be an Oracle database or a DB2 database, but the disclosure is not limited thereto. The exemplary disclosed implementation method may be modified to connect to any database without departing from the scope of the invention.

According to exemplary embodiments, the authenticating module 416 may be configured to authenticate the Java application 403 by implementing a java authentication authorization service (jaas). According to exemplary embodiments, authentication of the application 403 may be performed at runtime with connection properties and configuration details provided via system properties or environment variables.

According to exemplary embodiments, the URL generating module 418 may be configured to generate a database connection URL. The validating module 420 may be configured to validate the URL. The communication module 428 may be configured to establish a connection between the application 403 and the target database 412 based on the validation of the URL by the validating module 420 and successful authentication of the application 403 by the authenticating module 416.

According to exemplary embodiments, the application 403 may be independent of underlying authentication mechanism.

Figure 5:
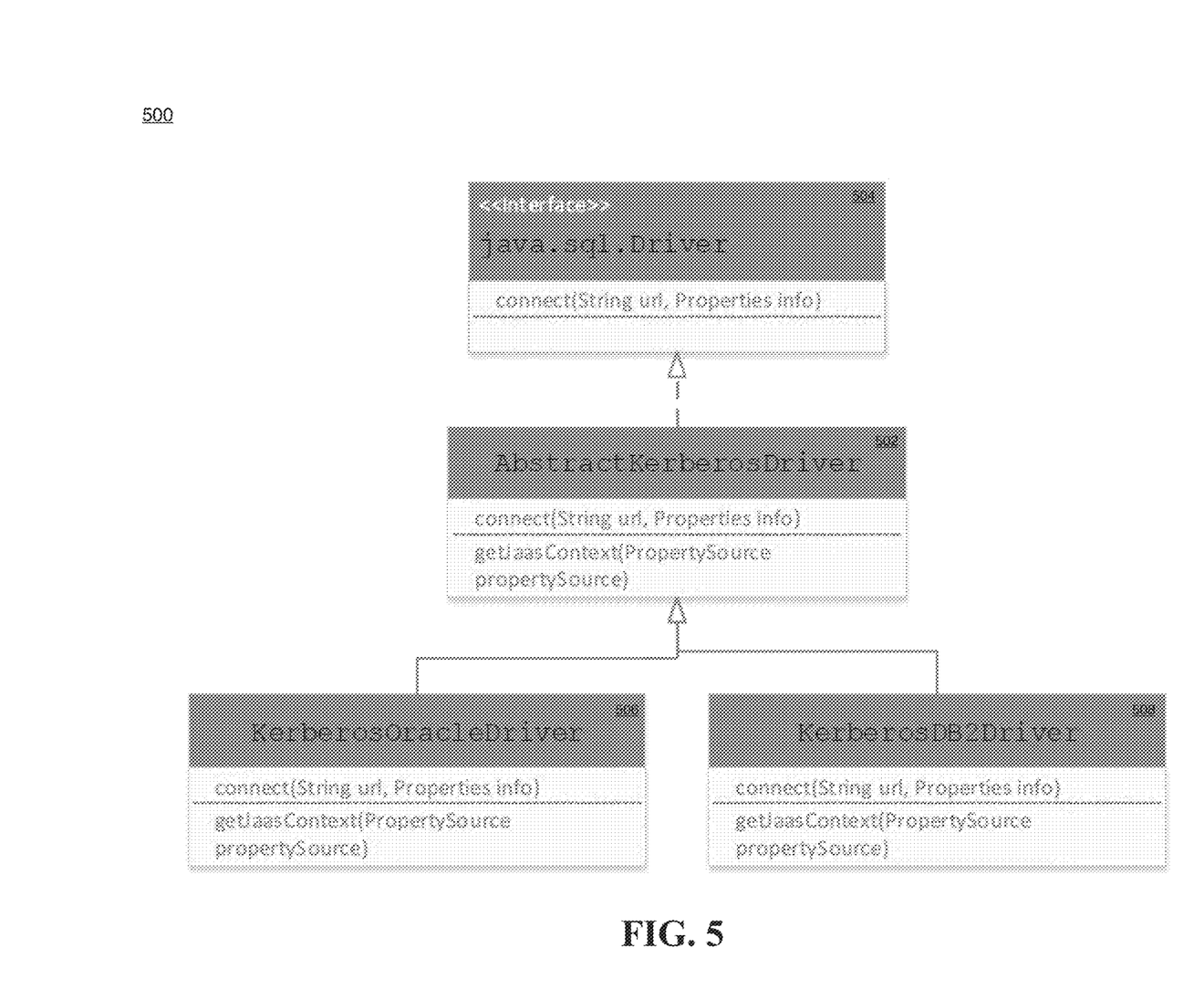
FIG. 5 illustrates a class diagram implemented by a smart database driver module of FIG. 4 in accordance with an exemplary embodiment.
Figure 6:
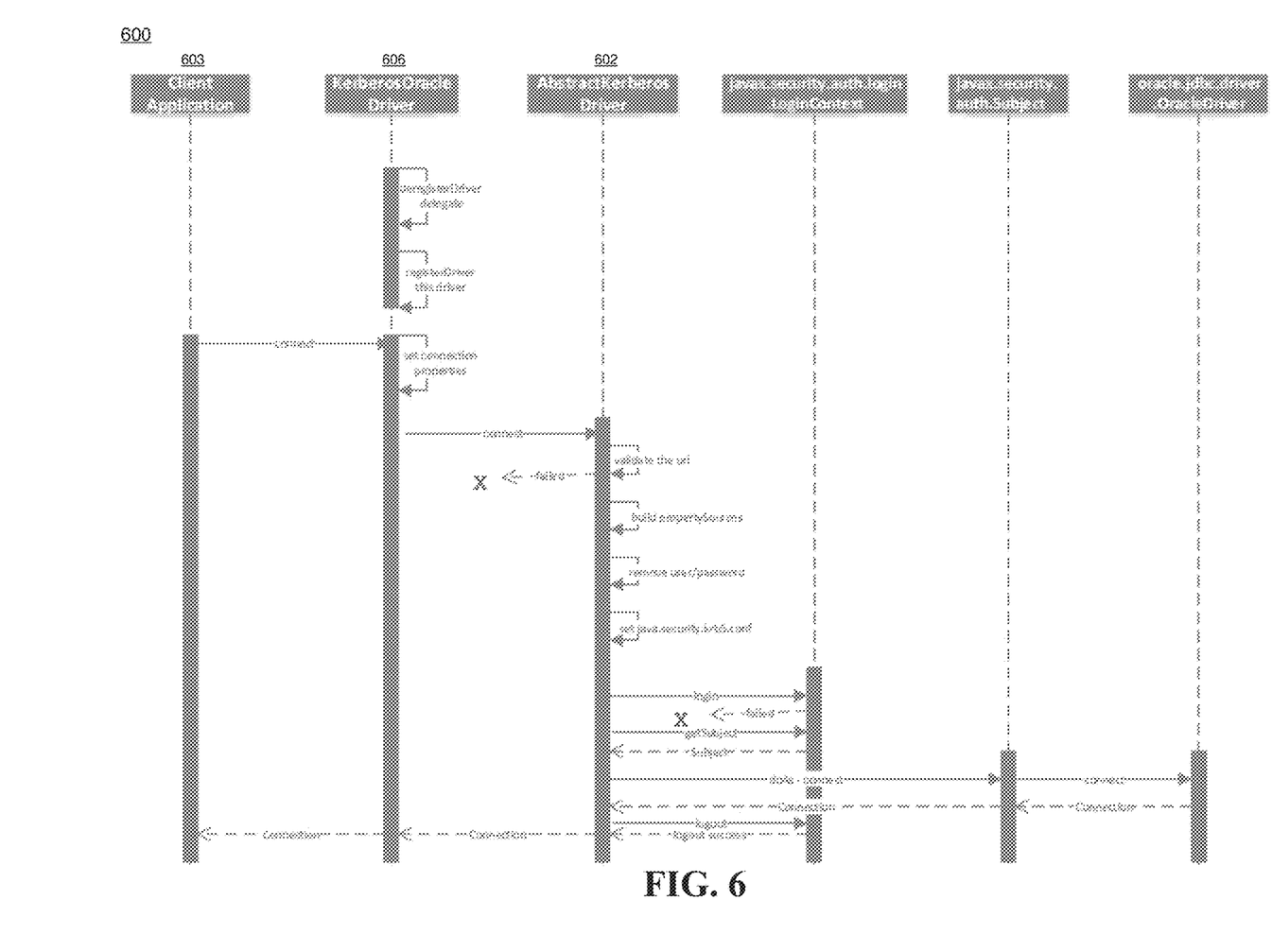
FIG. 6 illustrates an exemplary use case of sequence diagram for connect method in accordance with an exemplary embodiment.

FIG. 5 illustrates a class diagram 500 implemented by the SDDM 406 of FIG. 4 in accordance with an exemplary embodiment. FIG. 6 illustrates an exemplary use case of sequence diagram 600 for connect method described with reference to FIG. 4 in accordance with an exemplary embodiment.

Exemplary use case of a connection method will be described below referring to FIGS. 4-6.

According to exemplary embodiments, the creating module 424 may be configured to create a jaas configuration file that contains Kerberos login module to connect to the target database 412. The implementing module 422 may be configured to implement a credential cache from the Kerberos login module configuration to acquire a ticket granting ticket (TGT) to authenticate the application 403, 503.

According to exemplary embodiments, the implementing module 422 may be configured to implement a keytab file that contains a secret key and implement the secret key to authenticate the application 403, 503.

According to exemplary embodiments, the removing module 426 may be configured to remove username and password based authentication and implementing module 422 may be configured to implement Kerberos authentication.

According to exemplary embodiments, the creating module 424, by utilizing the abstract Kerberos driver 502, 602 may be configured to create an abstract Kerberos driver class that implements a java.sql.driver interface 504 and implements a connect method included in the java.sql.driver interface 504 to authenticate the application 403, 503 and establishes the connection between the application 403, 503 and the target database 412.

According to exemplary embodiments, the creating module 424, by utilizing the Kerberos Oracle driver 506, 606 may be configured to create a Kerberos Oracle driver class that extends the abstract Kerberos driver class and overrides the connect method for enforcing Kerberos connectivity for Oracle database connections.

According to exemplary embodiments, the creating module 424, by utilizing the Kerberos DB2 driver 508 may be configured to create a Kerberos DB2 driver class that extends the abstract Kerberos driver class and overrides the connect method for enforcing Kerberos connectivity for DB2 database connections.

Referring to FIGS. 4-6, the implementation details will be described bellows.

According to exemplary embodiments, the SDDM 406 may utilize Jaas to authenticate the application 403, 603 with minimal configurations, not requiring any application level code changes. The Jaas configuration file containing Kerberos login module configuration may use an existing credential cache to acquire the TOT or use a Keytab file containing a secret key to authenticate a principal. Once it authenticates successfully, it establishes the connection to the database 412 for the subject as shown in FIG. 4. This helps applications be independent of underlying authentication mechanism.

The following section describes three key classes as depicted in the class diagram 500 of FIG. 5 and the functionality implemented to enforce the Kerberos authentication through the SDDM 406 referring to FIGS. 5 and 6.

For example, the abstract Kerberos driver 502, 602 may implement the java.sql.driver interface 504 and implements all the methods in it. Connect method is one of the key methods implemented to authenticate and establish the connection to the target database 412. Below steps are performed in the connect method (see, e.g., FIG. 6), but the disclosure is not limited thereto.

First, the validating module 420 of the SDDM 406 may validate if the driver delegate accepts the URL supplied. If it accepts the URL, it will connect with Kerberos, which may include the following steps, but not limited thereto: building the property source from connection properties or system properties or environment properties; removing user and password from connection properties; setting the java.security.krb5.conf system property with the location from property source; creating a login context using the Kerberos login module implementation specified by JAAS_CONTEXT_NM (a named entry from the Jaas configuration file); reading the Jaas configuration file from a property source specified with java.security.auth.login.config property; establishing connection by authenticating with loginContext.login( ) method; if the authentication is succeeded, retrieving the Subject (principal that is requesting to connect to the database 412) from the login context; calling doAs (final Subject subject, final PrivilegedAction privilegedAction) static method on the Subject to associate the subject with current Thread'sAccessControlContext; and executing the action as the subject retrieved to establish the connection through the driver delegate.AbstractKerberosDriver.

According to exemplary embodiments, the Kerberos Oracle driver 506, 606 may extend the abstract Kerberos driver 502, 602 and may override the connect method for enforcing Kerberos connectivity for Oracle database connections. The connect method in this class may set Oracle specific Kerberos connection properties as listed below, and may call the connect method from abstract Kerberos driver 502, 602 to establish the connection, but the disclosure is not limited thereto.

```
OracleConnection.CONNECTION_PROPERTY_THIN_NET_AUTHEN-
TICATION_SERVICES = "(KERBEROS5)".
OracleConnection.CONNECTION_PROPERTY_THIN_NET_AUTHEN-
TICATION_KRB5_MUTUAL = "true".
```

According to exemplary embodiments, Kerberos DB2 driver 508 may extend the abstract Kerberos driver 502, 602 and may override the connect method for enforcing Kerberos connectivity for DB2 database connections. The connect method in this class may set DB2 specific Kerberos security mechanism as listed below, and may call the connect method from abstract Kerberos driver 502, 602 to establish the connection, but the disclosure is not limited thereto.

```
DB2BaseDataSource.propertyKey_securit:,,iMechanism =
DB2BaseDataSource.KERBEROS_SECURITY.
```

According to exemplary embodiments, applications intending to use the SDDM 406 may need to follow the below steps for integration, but the disclosure is not limited thereto. First, add Smart DB Driver jar in the application class path along with the existing standard JDBC driver. Second, replace the driver class name property value with the fully qualified driver class name from Smart DB Driver, e.g., as follows: Kerberos Oracle driver or Kerberos DB2 driver or the respective data source classes as needed. Third, create a Jaas configuration file that defines Kerberos login module to connect to the database and set to a JVM (Java Virtual Machine) argument—java.security.auth.login.config. Fourth, set JAAS_CONTEXT_NM as JVM argument or environment variable or connection property. An example jaas.conf is shown below.

```
JaasClient {
    com.sun.security.auth.module.Krb5LoginModule required
    credsType=initiator
    debug=true
    useTicketCache=true
    useCcache="file:<credentials cache file>"
    principal="<principal>";
};
```

In this example:

```
JAAS_CONTEXT_NM = JaasClient
useCcache = path to your credentials cache on the server,
Ex: file:/kcc/krb5cc_A12345
principal = functional account in Kerberos domain,
Ex: a123456@EXCHAD.JPMCHASE.NET.
```

Finally, provide the database connection URL in the data source definition, Ex: url=jdbc:oracle:thin:@127.0.0.1:10000:DUMMY.

Figure 7:
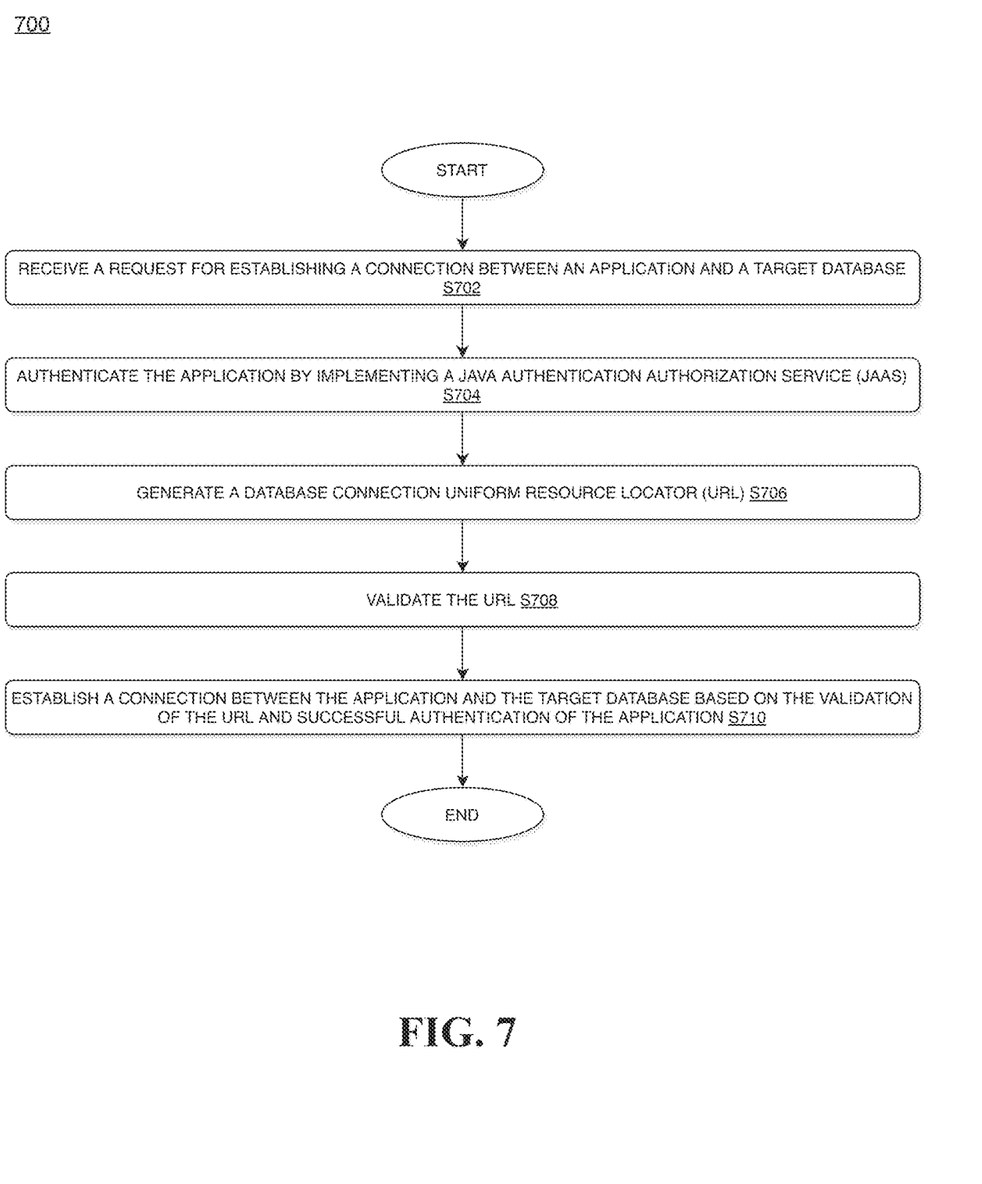
FIG. 7 illustrates a flow diagram for implementing a smart database driver in accordance with an exemplary embodiment.

FIG. 7 illustrates a flow diagram for implementing a smart database driver in accordance with an exemplary embodiment.

At step S702, the process 700 may cause a receiver to receive a request for establishing a connection between an application and a target database. According to exemplary embodiments, the application may be an application 403, 503 as illustrated in FIGS. 4 and 6, respectively and the target database may be a database 412 as illustrated in FIG. 4.

At step S704, the process 700 may authenticate the application by implementing a jaas, wherein authentication of the application may be performed at runtime with connection properties and configuration details provided via system properties or environment variables.

At step S706, the process 700 may generate a database connection uniform resource locator (URL).

At step S708, the process 700 may validate the URL.

At step S710, the process 700 may establish a connection between the application and the target database based on the validation of the URL and successful authentication of the application.

According to exemplary embodiments, the process 700 may further include: creating a jaas configuration file that contains Kerberos login module to connect to the target database; and implementing a credential cache from the Kerberos login module configuration to acquire a ticket granting ticket (TGT) to authenticate the application.

According to exemplary embodiments, the process 700 may further include: implementing a keytab file that contains a secret key; and implementing the secret key to authenticate the application.

According to exemplary embodiments, the process 700 may further include: removing username and password based authentication; and implementing Kerberos authentication.

According to exemplary embodiments, the process 700 may further include: creating an abstract Kerberos driver class that implements a java.sql.driver interface and implementing a connect method included in the java.sql.driver interface to authenticate the application and establish the connection between the application and the target database.

According to exemplary embodiments, the process 700 may further include: creating a Kerberos Oracle driver class that extends the abstract Kerberos driver class and overrides the connect method for enforcing Kerberos connectivity for Oracle database connections.

According to exemplary embodiments, the process 700 may further include: creating a Kerberos DB2 driver class that extends the abstract Kerberos driver class and overrides the connect method for enforcing Kerberos connectivity for DB2 database connections.

According to exemplary embodiments, the SDDD 402 may include a memory (e.g., a memory 106 as illustrated in FIG. 1) which may be a non-transitory computer readable medium that may be configured to store instructions for implementing an SDDM 406 for establishing a connection between an application and a target database as disclosed herein. The SDDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SDDM 406 or within the SDDD 402, may be used to perform one or more of the methods and processes as described herein. In a particular embodiment, the instructions may reside completely, or at least partially, within the memory 106, the medium reader 112, and/or the processor 104 (see FIG. 1) during execution by the SDDD 402.

For example, the instructions, when executed, may cause the processor 104 to perform the following: causing a receiver to receive a request for establishing a connection between an application and a target database; authenticating the application by implementing a java authentication authorization service (jaas), wherein authentication of the application is performed at runtime with connection properties and configuration details provided via system properties or environment variables; generating a database connection uniform resource locator (URL); validating the URL; and establishing a connection between the application and the target database based on the validation of the URL and successful authentication of the application, but the disclosure is not limited thereto.

According to exemplary embodiments, the instructions, when executed, may further cause the processor 104 to perform the following: creating a jaas configuration file that contains Kerberos login module to connect to the target database; and implementing a credential cache from the Kerberos login module configuration to acquire TGT to authenticate the application.

According to exemplary embodiments, the instructions, when executed, may further cause the processor 104 to perform the following: implementing a keytab file that contains a secret key; and implementing the secret key to authenticate the application.

According to exemplary embodiments, the instructions, when executed, may further cause the processor 104 to perform the following: removing username and password based authentication; and implementing Kerberos authentication.

According to exemplary embodiments, the instructions, when executed, may further cause the processor 104 to perform the following: creating an abstract Kerberos driver class that implements a java.sql.driver interface and implementing a connect method included in the java.sql.driver interface to authenticate the application and establish the connection between the application and the target database.

According to exemplary embodiments, the instructions, when executed, may further cause the processor 104 to perform the following: creating a Kerberos Oracle driver class that extends the abstract Kerberos driver class and overrides the connect method for enforcing Kerberos connectivity for Oracle database connections.

According to exemplary embodiments, the instructions, when executed, may further cause the processor 104 to perform the following: creating a Kerberos DB2 driver class that extends the abstract Kerberos driver class and overrides the connect method for enforcing Kerberos connectivity for DB2 database connections.

According to exemplary embodiments as disclosed above in FIGS. 1-7, technical improvements effected by the instant disclosure may include platforms for implementing a smart database driver that provides a suite of JDBC drivers for seamless integration with Java applications that run in containers or third-party products/applications to connect to databases that do not support Kerberos authentication out of the box, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a smart database driver by utilizing one or more processors and one or more memories, the method comprising:
   receiving a request for establishing a connection between an application and a target database;
   authenticating the application by implementing a java authentication authorization service (jaas), wherein authentication of the application is performed at runtime with connection properties and configuration details provided via system properties or environment variables;
   generating a database connection uniform resource locator (URL);
   validating the URL; and
   establishing a connection between the application and the target database based on the validation of the URL and successful authentication of the application.

2. The method according to claim 1, wherein the application is independent of underlying authentication mechanism.

3. The method according to claim 1, further comprising:
   creating a jaas configuration file that contains Kerberos login module to connect to the target database; and
   implementing a credential cache from the Kerberos login module configuration to acquire a ticket granting ticket (TGT) to authenticate the application.

4. The method according to claim 1, further comprising:
   implementing a keytab file that contains a secret key; and
   implementing the secret key to authenticate the application.

5. The method according to claim 1, further comprising:
   removing username and password based authentication; and
   implementing Kerberos authentication.

6. The method according to claim 1, further comprising:
   creating an abstract Kerberos driver class that implements a java.sql.driver interface and
   implementing a connect method included in the java.sql.driver interface to authenticate the application and establish the connection between the application and the target database.

7. The method according to claim 6, further comprising:
   creating a Kerberos Oracle driver class that extends the abstract Kerberos driver class and overrides the connect method for enforcing Kerberos connectivity for Oracle database connections.

8. The method according to claim 6, further comprising:
   creating a Kerberos DB2 driver class that extends the abstract Kerberos driver class and overrides the connect method for enforcing Kerberos connectivity for DB2 database connections.

9. A system for implementing a smart database driver, the system comprising:
   a receiver for receiving a request for establishing a connection between an application and a target database; and
   a processor operatively coupled to the receiver via a communication network, wherein the processor is configured to:
      authenticate the application by implementing a java authentication authorization service (jaas), wherein authentication of the application is performed at runtime with connection properties and configuration details provided via system properties or environment variables;
      generate a database connection uniform resource locator (URL);
      validate the URL; and
      establish a connection between the application and the target database based on the validation of the URL and successful authentication of the application.

10. The system according to claim 9, wherein the application is independent of underlying authentication mechanism.

11. The system according to claim 9, wherein the processor is further configured to:
create a jaas configuration file that contains Kerberos login module to connect to the target database; and
implement a credential cache from the Kerberos login module configuration to acquire a ticket granting ticket (TGT) to authenticate the application.

12. The system according to claim 9, wherein the processor is further configured to:
implement a keytab file that contains a secret key; and
implement the secret key to authenticate the application.

13. The system according to claim 9, wherein the processor is further configured to:
remove username and password based authentication; and
implement Kerberos authentication.

14. The system according to claim 9, wherein the processor is further configured to:
create an abstract Kerberos driver class that implements a java.sql.driver interface and
implement a connect method included in the java.sql.driver interface to authenticate the application and establish the connection between the application and the target database.

15. The system according to claim 14, wherein the processor is further configured to:
create a Kerberos Oracle driver class that extends the abstract Kerberos driver class and overrides the connect method for enforcing Kerberos connectivity for Oracle database connections.

16. The system according to claim 14, wherein the processor is further configured to:
creating a Kerberos DB2 driver class that extends the abstract Kerberos driver class and overrides the connect method for enforcing Kerberos connectivity for DB2 database connections.

17. A non-transitory computer readable medium configured to store instructions for implementing a smart database driver, wherein, when executed, the instructions cause a processor to perform the following:
causing a receiver to receive a request for establishing a connection between an application and a target database;
authenticating the application by implementing a java authentication authorization service (jaas), wherein authentication of the application is performed at runtime with connection properties and configuration details provided via system properties or environment variables;
generating a database connection uniform resource locator (URL);
validating the URL; and
establishing a connection between the application and the target database based on the validation of the URL and successful authentication of the application.

18. The non-transitory computer readable medium according to claim 17, wherein, when executed, the instructions further cause the processor to perform the following:
creating a jaas configuration file that contains Kerberos login module to connect to the target database; and
implementing a credential cache from the Kerberos login module configuration to acquire a ticket granting ticket (TGT) to authenticate the application.

19. The non-transitory computer readable medium according to claim 17, wherein, when executed, the instructions further cause the processor to perform the following:
removing username and password based authentication; and
implementing Kerberos authentication.

20. The non-transitory computer readable medium according to claim 17, wherein, when executed, the instructions further cause the processor to perform the following:
creating an abstract Kerberos driver class that implements a java.sql.driver interface and
implementing a connect method included in the java.sql.driver interface to authenticate the application and establish the connection between the application and the target database.

* * * * *